United States Patent
Feng et al.

(10) Patent No.: US 11,796,795 B2
(45) Date of Patent: Oct. 24, 2023

(54) METHOD FOR DESIGNING DIFFRACTIVE OPTICAL ELEMENT, DIFFRACTIVE OPTICAL ELEMENT, AND SYSTEM FOR DESIGNING DIFFRACTIVE OPTICAL ELEMENT

(71) Applicant: JIAXING UPHOTON OPTOELECTRONICS TECHNOLOGY CO., LTD., Tongxiang (CN)

(72) Inventors: Hui Feng, Tongxiang (CN); Hui Zhao, Tongxiang (CN)

(73) Assignee: JIAXING UPHOTON OPTOELECTRONICS TECHNOLOGY CO., LTD., Tongxiang (CN)

(*) Notice: Subject to any disclaimer, the term of this patent is extended or adjusted under 35 U.S.C. 154(b) by 0 days.

(21) Appl. No.: 18/001,131

(22) PCT Filed: Jun. 8, 2021

(86) PCT No.: PCT/CN2021/099013
§ 371 (c)(1),
(2) Date: Dec. 8, 2022

(87) PCT Pub. No.: WO2021/249407
PCT Pub. Date: Dec. 16, 2021

(65) Prior Publication Data
US 2023/0194857 A1   Jun. 22, 2023

(30) Foreign Application Priority Data
Jun. 9, 2020   (CN) .......................... 202010518114.0

(51) Int. Cl.
*G02B 27/00* (2006.01)
*G02B 5/18* (2006.01)

(52) U.S. Cl.
CPC ....... *G02B 27/0012* (2013.01); *G02B 5/1866* (2013.01); *G02B 2005/1804* (2013.01)

(58) Field of Classification Search
CPC .............. G02B 27/0012; G02B 5/1866; G02B 2005/1804; G02B 27/4266
See application file for complete search history.

(56) References Cited

U.S. PATENT DOCUMENTS

2010/0277937 A1* 11/2010 Ilzuka .................. G02B 5/1871
359/566

FOREIGN PATENT DOCUMENTS

| CN | 1654985 A | 8/2005 |
|---|---|---|
| CN | 101984767 A | 3/2011 |

(Continued)

OTHER PUBLICATIONS

International Search Report dated Aug. 23, 2021 from PCT Application No. PCT/CN2021/099013.

*Primary Examiner* — Kimberly N. Kakalec
(74) *Attorney, Agent, or Firm* — INNOVATION CAPITAL LAW GROUP, LLP; Vic Lin

(57) ABSTRACT

The invention provides a method for designing a diffractive optical element, characterized in comprising: S101: obtaining a first optical field pattern on a target plane; S102: converting the first optical field pattern on the target plane into a second optical field pattern on a spherical surface; S103: compensating for missing points of the second optical field pattern on the spherical surface, and matching grayscale values, so as to obtain a corrected third optical field pattern; and S104: obtaining a phase distribution of the diffractive optical element according to the third optical field pattern. By means of the design method, the projection quality of a diffractive optical element is improved.

8 Claims, 6 Drawing Sheets

(56) References Cited

FOREIGN PATENT DOCUMENTS

| | | | |
|---|---|---|---|
| CN | 109507844 A | 3/2019 | |
| CN | 110892716 A | 3/2020 | |
| CN | 111913299 A | 11/2020 | |
| KR | 20190054666 A | 5/2019 | |
| WO | WO-2021057651 A1 * | 4/2021 | ......... G02B 27/0012 |

* cited by examiner

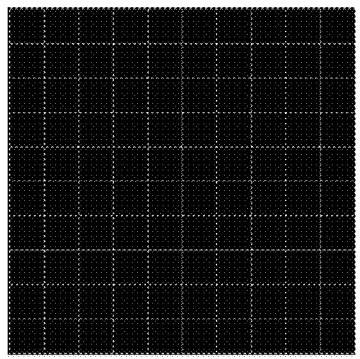
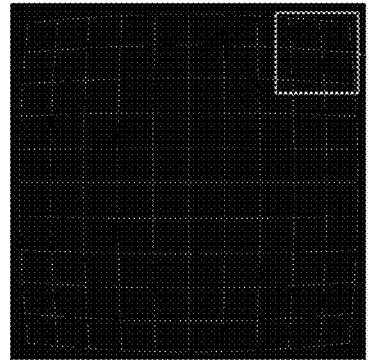
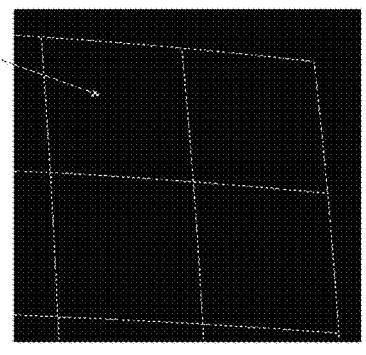
FIG. 3A  FIG. 3B  FIG. 3C
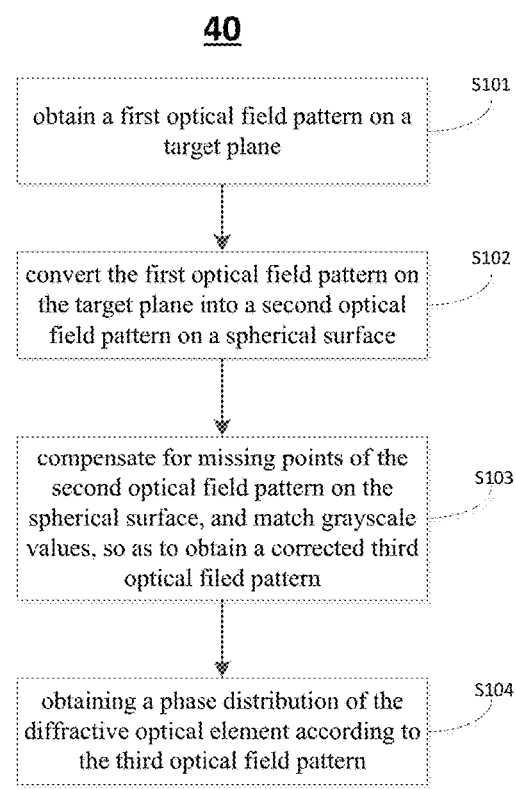
FIG. 4

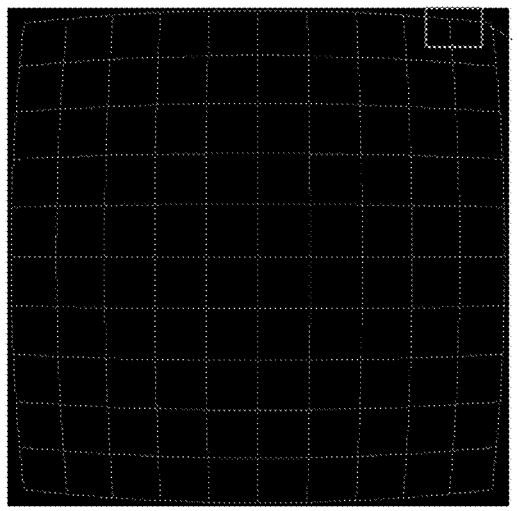
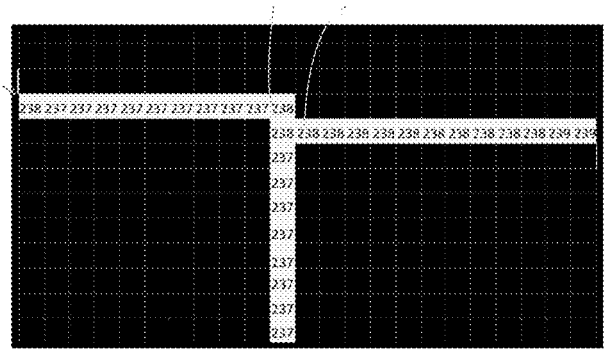
FIG. 7A  FIG. 7B
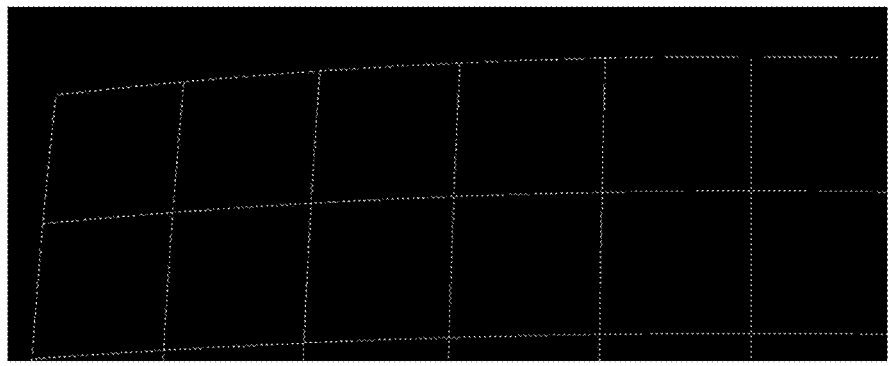
FIG. 8A

US 11,796,795 B2

METHOD FOR DESIGNING DIFFRACTIVE OPTICAL ELEMENT, DIFFRACTIVE OPTICAL ELEMENT, AND SYSTEM FOR DESIGNING DIFFRACTIVE OPTICAL ELEMENT

TECHNICAL FIELD

The invention generally relates to the technical field of optics, and, especially, to a method for designing a diffractive optical element, a diffractive optical element obtained by such method and a system for designing a diffractive optical element.

BACKGROUND ART

In some application scenarios, patterns projected by a diffractive optical element (DOE) are required to have a large field of view (FOV), a complex graphic, fine and clear lines and other characteristics. For example, when a target graph is to be made, it is needed to use a relatively thin line width, or even a single-pixel line width, then convert a planar target graph having a complex pattern to a spherical surface, and design a diffractive optical element according to the spherical graph. Due to the algorithm characteristics of DOE, when the line width of a target graph is relatively thin, the phenomenon of missing point will take place in performing coordinate transformation and distortion correction operations; and if a diffractive optical element designed using a spherical graph with some points missed is used, the continuity and uniformity of a pattern as actually projected will be poor, affecting the practicability and aesthetics of the projected pattern.

The contents in the Background Art are merely the technologies known by the disclosers, and do not surely represent the prior art in the field.

SUMMARY OF THE INVENTION

In view of at least one of the defects in the prior art, the invention provides a method for designing a diffractive optical element, characterized in comprising:

S101: obtaining a first optical field pattern on a target plane;
S102: converting the first optical field pattern on the target plane into a second optical field pattern on a spherical surface;
S103: compensating for missing points of the second optical field pattern on the spherical surface, and matching grayscale values, so as to obtain a corrected third optical field pattern; and
S104: obtaining a phase distribution of the diffractive optical element according to the third optical field pattern, so as to obtain a phase distribution of the diffractive optical element.

According to one aspect of the invention, wherein the step S101 comprises: drawing the first optical field pattern using a line width of one pixel.

According to one aspect of the invention, wherein the step S102 comprises: performing calculation according to a working distance and a FOV angle of the diffractive optical element to convert the first optical field pattern on the target plane into the second optical field pattern on the spherical surface.

According to one aspect of the invention, wherein the step S102 further comprises: converting the first optical field pattern on the target plane into the second optical field pattern on the spherical surface by means of coordinate transformation and grayscale compensation.

According to one aspect of the invention, wherein the step S103 comprises: filling broken points in a line segment in the second optical field pattern on the spherical surface.

According to one aspect of the invention, wherein the step S103 comprises: filling a broken point at an intersection of multiple line segments in the second optical field pattern on the spherical surface.

According to one aspect of the invention, wherein the step S103 comprises: calculating grayscale values of the missing points according to grayscale values of adjacent points of the missing points.

According to one aspect of the invention, wherein the step S103 comprises: performing compensation by means of drawing software or manually.

The invention further provides a diffractive optical element designed by the method described above.

The invention also provides a system for designing a diffractive optical element, comprising:

a unit for generating a first optical field pattern on a target plane;
a unit for converting the first optical field pattern on the target plane into a second optical field pattern on a spherical surface;
a unit for compensating for missing points of the second optical field pattern on the spherical surface, and matching grayscale values, so as to obtain a corrected third optical field pattern on the spherical surface; and
a unit for obtaining a phase distribution of the diffractive optical element according to the corrected third optical field pattern on the spherical surface.

A preferred embodiment of the invention provides a method for designing a diffractive optical element, comprising: obtaining a spherical graph by means of coordinate transformation of a planar target graph; performing broken-point compensation and correction on the spherical graph; and then designing the diffractive optical element according to the corrected spherical graph. By means of the design method, the projection quality of a diffractive optical element is improved, and a projected pattern with good continuity and uniformity is obtained. As a result, a large FOV, high-precision, clear, uniform and complex projected pattern becomes possible, enhancing the practicability of the diffractive optical element in engineering application and the aesthetics of the projected pattern thereof. The invention also provides a diffractive optical element designed using the design method, and a system for designing a diffractive optical element.

BRIEF DESCRIPTION OF THE DRAWINGS

The drawings that constitute part of the specification are provided for further understanding the invention, and are used for explaining the invention along with the embodiments of the invention, but do not make any limitation of the same. In the drawings:

FIG. 3A illustrates a planar target graph in accordance with one preferred embodiment of the invention;
FIG. 3B illustrates a spherical target graph obtained after coordinate transformation of the planar target graph in accordance with one preferred embodiment of the invention;

FIG. 3C illustrates the situation of broken point in corner area in a large FOV of the spherical target graph after transformation in accordance with one preferred embodiment of the invention;

FIG. 4 illustrates a method for designing a diffractive optical element in accordance with one preferred embodiment of the invention;

FIG. 7A illustrates a spherical target graph after broken-point compensation in accordance with one preferred embodiment of the invention;

FIG. 7B illustrates some points of the spherical target graph after compensation and the grayscale values thereof in accordance with one preferred embodiment of the invention;

FIG. 8A illustrates part of the spherical target graph without compensation in accordance with one preferred embodiment of the invention;

DETAILED DESCRIPTION OF THE EMBODIMENTS OF THE INVENTION

Figure 1:
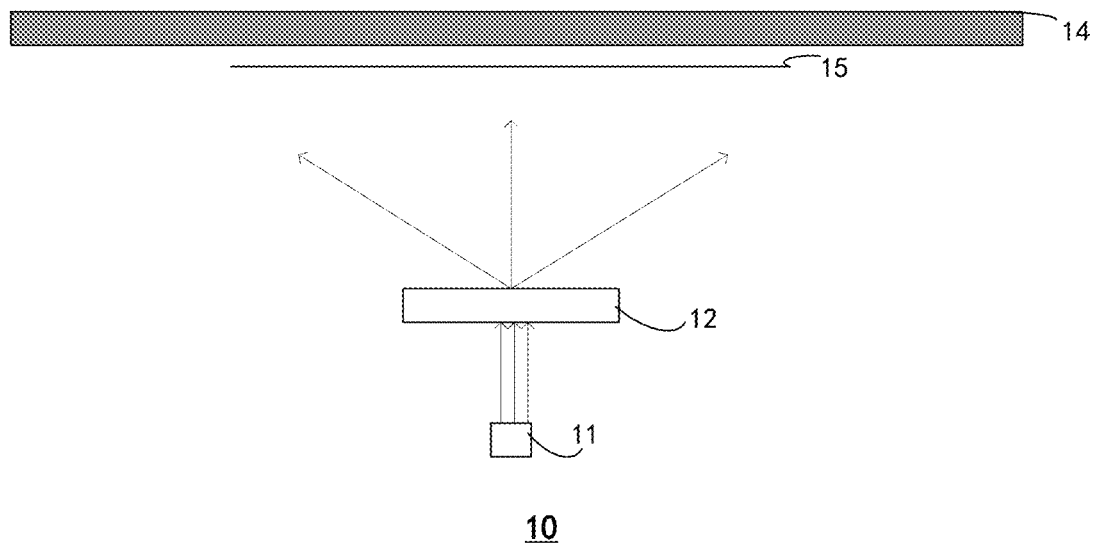
FIG. 1 schematically illustrates a large FOV pattern projection system applying a diffractive optical element.

Certain exemplary embodiments will be described below only in a brief manner. Just as those skilled in the art will recognize, changes in various ways to the embodiments described herein can be carried out without departing from the spirit or scope of the invention. Therefore, the drawings and the following description are deemed essentially exemplary, instead of limitative.

In the description of the invention, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and are used only for the purpose of facilitating description of the invention and simplification of the description, instead of indicating or suggesting that the denoted devices or elements must be oriented specifically, or configured or operated in some specific orientation. Thus, such terms should not be construed to limit the invention. In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the invention, "plurality" means two or above, unless otherwise defined explicitly and specifically.

In the description of the invention, it needs to be noted that, unless otherwise specified and defined explicitly, such terms as "mount" "link" and "connect" should be understood as generic terms. For example, connection may refer to fixed connection, dismountable connection, or integrated connection; also to mechanical connection, electrical connection or intercommunication; further to direct connection, or indirect connection by an intermediary medium; or even to internal communication between two elements or interaction between two elements. For those skilled in the art, they can construe the specific meaning of such terms herein in light of the specific circumstances.

Herein, unless otherwise specified and defined explicitly, if a first feature is "above" or "below" a second one, this may cover the direct contact between the first and second features, also cover the contact via another feature therebetween, instead of the direct contact. Furthermore, if a first feature "above", "over" or "on the top of" a second one, this may cover the case that the first feature is right above or on the inclined top of the second feature, or just indicate that the first feature has a horizontal height higher than that of the second feature. If a first feature is "below", "under" or "on the bottom of" a second feature, this may cover the case that the first feature is right below and on the inclined bottom of the second feature, or just indicates that the first feature has a horizontal height lower than that of the second feature.

The disclosure below provides many different implementations or cases so as to realize different structures described in the invention. In order to simplify the disclosure of the invention, the parts and arrangements embodied in specific cases will be described below. Surely, they are just for the exemplary purpose, not intended to limit the invention. Besides, the invention may repeat a reference number and/or reference letter in different cases, and such repeat is for the purpose of simplification and clarity, which does not represent any relationship among various implementations and/or arrangements as discussed. In addition, the invention provides cases of various specific techniques and materials, but those skilled in the art can also be aware of application of other techniques and/or use of other materials.

The embodiments of the invention will be introduced below with reference to the drawings. It should be appreciated that the embodiments described here are only for the purpose of illustrating and explaining, instead of restricting, the invention.

As shown in FIG. 1, the process of pattern projection is described by taking a pattern projection system 10 with large FOV as an example. In the pattern projection system 10 with large FOV, laser beams are emitted when a light source 11 is driven, and are incident onto a diffractive optical element 12. The diffractive optical element 12, located downstream of the optical path of the light source 11, receives the light beams emitted by the light source 11, and projects a preset pattern after modulation. The light beams projected by the diffractive optical element 12 are projected onto a target plane 14, forming a planar optical field 15 of large FOV. Taking a diffractive optical element of the tool type as an example, the planar optical field 15 has a pattern that is customized according to the engineering or design needs, for example a straight line, a cross line, a rectangular grid or other patterns.

Figure 2:
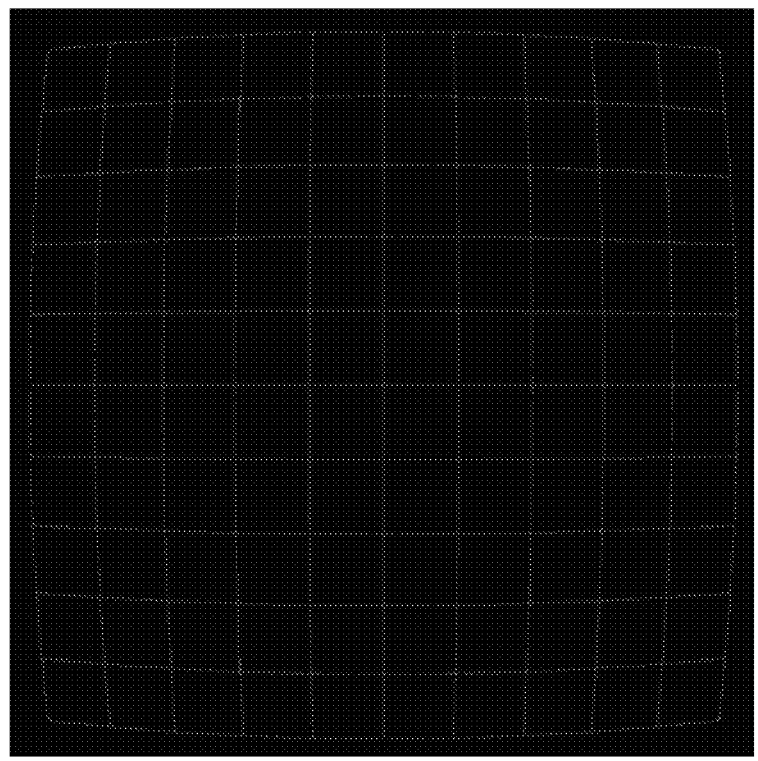
FIG. 2 illustrates a spherical target graph calculated out according to a planar target graph.

Since a diffractive optical element is designed based on the theory of angular spectrum, it is needed to calculate a light wave's amplitude and/or phase on the angular spectrum, namely, it is needed to calculate the propagation and superposition of the amplitude and/or phase of a light wave on a spherical surface. Therefore, at the time of designing a diffractive optical element, it is needed to convert a predetermined planar optical field pattern projected on a target plane, i.e., a planar target graph, into a corresponding spherical optical field pattern, i.e., a spherical target graph, and then perform phase distribution calculation for the diffractive optical element based on the spherical target graph and parameters such as a light source parameter, a projection distance and/or a field angle. A spherical target graph converted from a planar target graph, is shown in FIG. 2.

However, in some application scenarios, the customized target pattern requires clear and fine lines, and it is therefore needed to draw the lines of the target graph using a smaller line width, for example, one pixel, when the planar target graph is to be drawn. In performing the "planar-to-spherical" coordinate conversion described above, a planar target graph drawn in single pixel may be distorted in the process of the conversion into a spherical target graph, as shown in FIGS. 3A, 3B and 3C.

FIG. 3A is an embodiment of a target pattern customized according to the engineering or design needs, in which a planar target graph is drawn using a single-pixel line width; FIG. 3B is a spherical target graph obtained after coordinate conversion of the planar target graph; and FIG. 3C is an enlarged view of a corner away from the FOV center in the spherical target graph. Because the planar target graph (FIG. 3A) is drawn using a single-pixel line width, FIG. 3B is obtained after coordinate transformation, and the edge area of FIG. 3B is distorted. As shown in FIGS. 3A and 3B, the closer a portion to the FOV center, the more approximate the corresponding portions in FIGS. 3B and 3A, the slighter the distortion; whereas the farther a portion away from the FOV center, the greater the difference between the corresponding portions in FIGS. 3B and 3A, the severer the distortion, and the situation of broken point or missing point may occur.

If a diffractive optical element (DOE) is designed using a spherical target graph with distortion (missing point or broken point), the pattern actually projected by the diffractive optical element designed as so would contain more serious distortion, and the continuity and uniformity are poor. Therefore, the invention provides a method for designing a more ideal diffractive optical element by correcting distortions caused in the process of conversion of a planar target graph into a spherical target graph. As shown in FIG. 4, according to one preferred embodiment of the invention, the invention provides a method 40 for designing a diffractive optical element, comprising:

In step S101, obtaining a first optical field pattern on a target plane. Namely, a planar graph of a precustomized target pattern, i.e., a planar target graph (the first optical field pattern), is drawn according to industrial engineering or art design needs.

In step S102, converting the first optical field pattern on the target plane into a second optical field pattern on a spherical surface. Namely, coordinate conversion is performed, and a spherical target graph (the second optical field pattern) is obtained according to the first optical field pattern, a working distance of the diffractive optical element and/or a FOV angle.

In step S103, compensating for missing points of the second optical field pattern on the spherical surface to make up for missing points and/or broken points, and matching grayscale values, so as to obtain a corrected third optical field pattern.

In step S104, obtaining a phase distribution of the diffractive optical element according to the third optical field pattern. Namely, a phase distribution of the micro-nano structure unit of the diffractive optical element is designed according to the corrected spherical target graph (the third optical field pattern), so as to improve the quality of the projected pattern of the diffractive optical element.

The design method 40 is described in detail with reference to FIGS. 5A-9B.

Figure 5A:
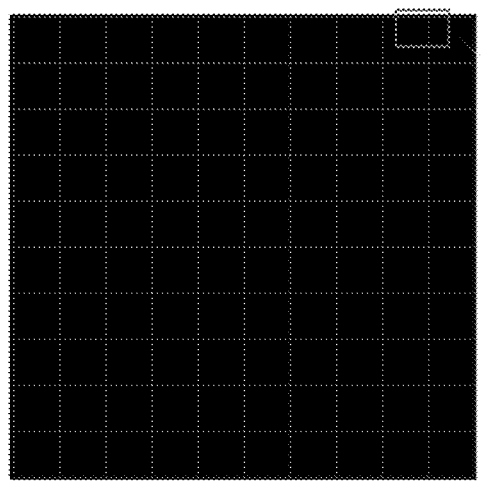
FIG. 5A illustrates a planar target graph in accordance with one preferred embodiment of the invention.
Figure 5B:
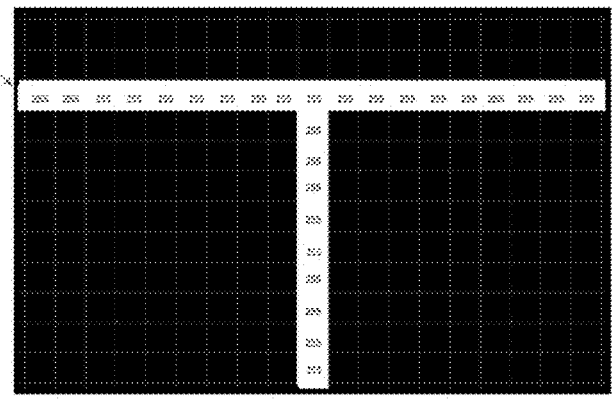
FIG. 5B illustrates some points of the planar target graph and the grayscale values thereof in accordance with one preferred embodiment of the invention.

According to one preferred embodiment of the invention, in step S101, a line width of one pixel is used to draw the first optical field pattern, so as to obtain a clear and fine target pattern. As shown in FIGS. 5A and 5B, FIG. 5A is a first optical field pattern drawn using a line width of one pixel, and FIG. 5B is an enlarged schematic diagram of some points in the first optical field pattern and the grayscale values of the points.

Figure 6A:
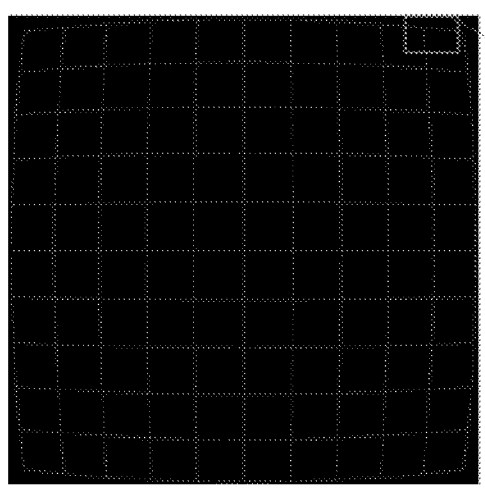
FIG. 6A illustrates a spherical target graph after coordinate transformation and grayscale compensation in accordance with one preferred embodiment of the invention.
Figure 6B:
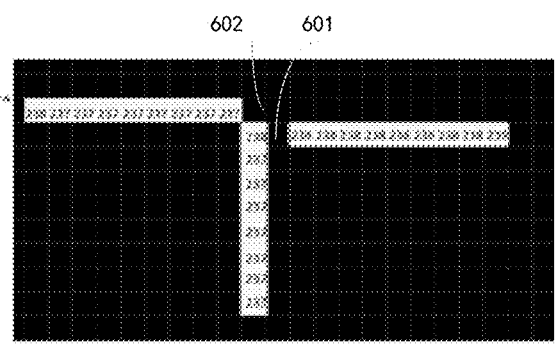
FIG. 6B illustrates some points of the spherical target graph after transformation and the grayscale values thereof in accordance with one preferred embodiment of the invention.

According to one preferred embodiment of the invention, in step S102, a second optical field pattern is calculated according to the first optical field pattern, the working distance of the diffractive optical element and/or the FOV angle. In addition, in the process of conversion from the first optical field pattern to the second optical field pattern, pixels may be compressed when a corner area in the large FOV of the planar target graph is converted into the spherical target graph, so as to cause that the original planar target graph with uniform optical field intensity (consistent grayscale values) will be converted into a spherical target graph with non-uniform optical field intensity (inconsistent grayscale values). Therefore, corresponding calculation and conversion are further needed to be performed on the grayscale values at the time of carrying out coordinate conversion from the plane to the spherical surface, so as to obtain grayscale values of the points in the second optical field pattern. Although mentioned above is an embodiment of a predetermined target optical field with uniform optical field intensity, a person skilled in the art can obviously know that corresponding calculation and conversion are still needed to be performed on the grayscale values in the case of a predetermined target optical field with non-uniform optical field intensity. As shown in FIGS. 6A and 6B, FIG. 6A illustrates a second optical field pattern obtained after coordinate transformation and grayscale conversion, and FIG. 6B illustrates an enlarged view of some points in the second optical field pattern and the grayscale values thereof, from which it can be seen that grayscales become non-uniform, and broken points and missing points appear after the planar target pattern is converted into a spherical target pattern, so that the linear pattern becomes discontinuous. As shown in FIG. 6B, point 601 and point 602 are missing points.

According to one preferred embodiment of the invention, in step S103, missing points of the second optical field pattern on the spherical surface are compensated for, and grayscale values are matched, so as to obtain a corrected third optical field pattern, for example, one or more of the following processing may be included:

(1) filling broken points in a line segment in the second optical field pattern on the spherical surface, for example, filling the point 601 in FIG. 6B;

(2) filling a broken point at an intersection of multiple line segments in the second optical field pattern on the spherical surface, for example filling the point 602 in FIG. 6B.

(3) calculating grayscale values of the missing points by means of grayscale values of adjacent points of the missing points.

As shown in FIGS. 7A and 7B, among them, FIG. 7A illustrates a corrected third optical field pattern, and FIG. 7B illustrates an enlarged view of some points in the third optical field pattern and the grayscale values thereof. In FIG. 7B, point 701 is a broken point (corresponding to the missing point 601 in FIG. 6B) in a line segment, and point 702 is a broken point (corresponding to the missing point 602 in FIG. 6B) at an intersection of two line segments. The points 701 and 702 are filled, and the grayscale values of the points 701 and 702 are calculated using the grayscale values of the points adjacent to the points 701 and 702. The grayscale value of a filled point may be obtained by rounding an average value of the grayscale values of the points at two adjacent ends. After correction, the third optical field pattern in FIG. 7A becomes continuous and smooth.

According to one preferred embodiment of the invention, the broken-point compensation may be implemented by means of drawing software or manually.

According to one preferred embodiment of the invention, the planar target graph as shown in FIG. 5A requires the line width of the pattern to be one pixel, the pattern including 10*10 squares, and each having a size of 8 cm*8 cm. The working distance of the diffractive optical element is 100 cm, the FOV range of projection is 40°*40°, and the wavelength of the light source is 650 nm. When a diffractive optical element (DOE) is to be designed, single pixel is utilized to draw a grid shape, i.e., a planar target graph, on the plane, as shown in FIG. 5A. A spherical target graph is calculated out by means of coordinate transformation and grayscale compensation, as shown in FIG. 6A. With regard to missing points, point-by-point compensation is performed employing drawing software or manually, and then a corresponding grayscale pixel value is compensated for according to the grayscales of the adjacent points after coordinate transformation, as shown in FIG. 7A. A diffractive optical element DOE is designed and obtained according to the corrected spherical target graph, and this diffractive optical element may produce a better projection effect.

Figure 8B:
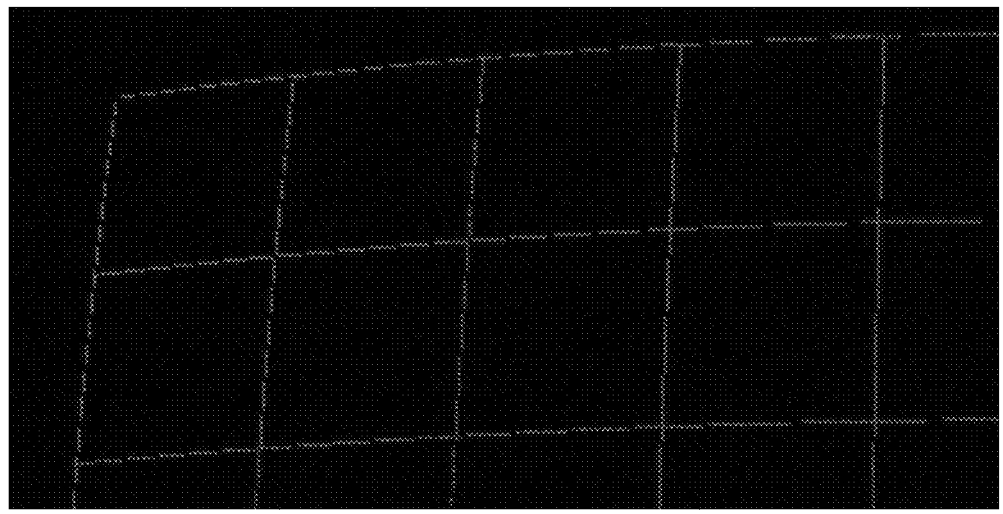
FIG. 8B illustrates a target optical field effect simulated out by a diffractive optical element designed according to the spherical target graph without compensation in accordance with one preferred embodiment of the invention.
Figure 9A:
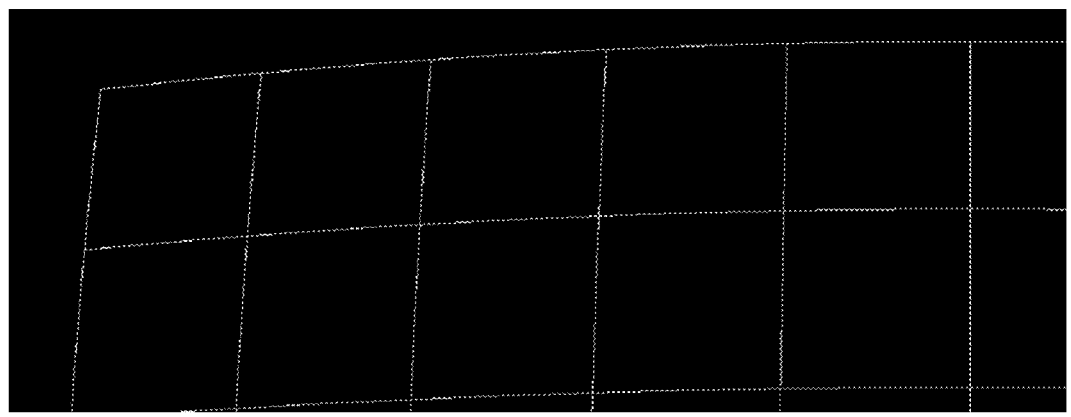
FIG. 9A illustrates part of the spherical target graph after broken-point compensation in accordance with one preferred embodiment of the invention.
Figure 9B:
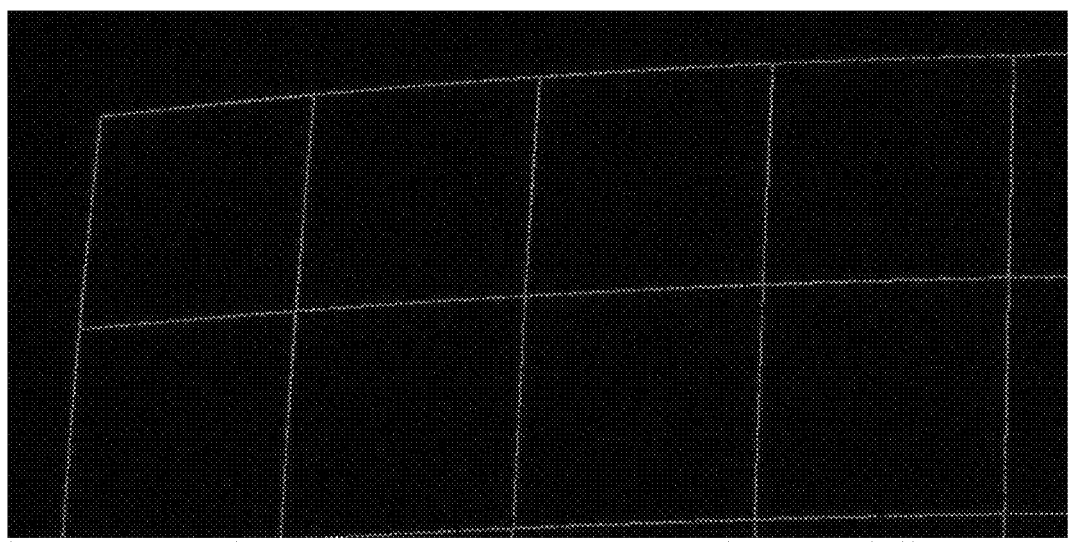
FIG. 9B illustrates a target optical field effect simulated out by a diffractive optical element designed according to the spherical target pattern after broken-point compensation in accordance with one preferred embodiment of the invention.

FIG. 8A illustrates part of the spherical target graph without compensation, and FIG. 8B illustrates a target optical field effect simulated out by the DOE designed using the spherical target graph, from which it can be seen that multiple broken points exist among the amplified lines, and the overall line quality is poor. FIG. 9A is part of the spherical target graph after compensation and correction, and FIG. 9B is a target optical field effect simulated out by the DOE designed using the corrected spherical target graph, from which it can be seen that the number of broken points in the amplified lines is greatly reduced, and the overall line quality is higher.

According to one preferred embodiment of the invention, the invention further provides a diffractive optical element designed by the method described above.

According to one preferred embodiment of the invention, the invention further provides a system for designing a diffractive optical element, comprising:
a unit for generating a first optical field pattern on a target plane;
a unit for converting the first optical field pattern on the target plane into a second optical field pattern on a spherical surface;
a unit for compensating for missing points of the second optical field pattern on the spherical surface, and matching grayscale values, so as to obtain a corrected third optical field pattern on the spherical surface; and
a unit for obtaining a phase distribution of the diffractive optical element according to the corrected third optical field pattern on the spherical surface.

A preferred embodiment of the invention provides a method for designing a diffractive optical element, comprising: obtaining a spherical target graph by means of coordinate transformation of a planar target graph; performing broken-point compensation and correction on the spherical target graph; and then designing the diffractive optical element according to the corrected spherical target graph. By means of the design method, the projection quality of a diffractive optical element is improved, and a projected pattern with good continuity and uniformity is obtained. As a result, a large FOV, high-precision, clear, uniform and complex projected pattern becomes possible, enhancing the practicability of the diffractive optical element in engineering application and the aesthetics of the projected pattern thereof. The invention also provides a diffractive optical element designed using the design method, and a system for designing a diffractive optical element.

It should be noted finally that the contents described above are just preferred embodiments of the invention, and are not used to limit the invention. Although the detailed description of the invention has been provided with reference to the foregoing embodiments, those skilled in the art may still make modifications to the technical solution as recited in each of the foregoing embodiments, or conduct equivalent replacement of some technical features therein. Any modification, equivalent replacement, or improvement, if only falling into the spirit and principles as stated herein, should be included in the scope of protection of the invention.

We claim:

1. A method for designing a diffractive optical element, comprising the following steps:
   S101: obtaining a first optical field pattern on a target plane;
   S102: converting the first optical field pattern on the target plane into a second optical field pattern on a spherical surface;
   S103: compensating for missing points of the second optical field pattern on the spherical surface, and matching grayscale values, so as to obtain a corrected third optical field pattern; and
   S104: obtaining a phase distribution of the diffractive optical element according to the third optical field pattern.

2. The method of claim 1, wherein the step S101 comprises: drawing the first optical field pattern using a line width of one pixel.

3. The method of claim 1, wherein the step S102 comprises: performing calculation according to a working distance and a FOV angle of the diffractive optical element to convert the first optical field pattern on the target plane into the second optical field pattern on the spherical surface.

4. The method of claim 1, wherein the step S102 further comprises: converting the first optical field pattern on the target plane into the second optical field pattern on the spherical surface by means of coordinate transformation and grayscale compensation.

5. The method of claim 1, wherein the step S103 comprises: filling broken points in a line segment in the second optical field pattern on the spherical surface.

6. The method of claim 1, wherein the step S103 comprises: filling a broken point at an intersection of multiple line segments in the second optical field pattern on the spherical surface.

7. The method of claim 1, wherein the step S103 comprises: calculating grayscale values of the missing points according to grayscale values of adjacent points of the missing points.

8. The method of claim 1, wherein the step S103 comprises: performing compensation by means of drawing software.

* * * * *